United States Patent
Katsunuma et al.

[11] Patent Number: 5,838,492
[45] Date of Patent: Nov. 17, 1998

[54] METHOD AND APPARATUS FOR A BINOCULAR OPTICAL SYSTEM

[75] Inventors: Atsushi Katsunuma, Saitama-ken; Kazuaki Sato, Tokyo, both of Japan

[73] Assignee: Nikon Corporation, Tokyo, Japan

[21] Appl. No.: 839,381

[22] Filed: Apr. 17, 1997

[30] Foreign Application Priority Data

Apr. 19, 1996 [JP] Japan ................................ 8-122517

[51] Int. Cl.$^6$ .................................................. G02B 23/00
[52] U.S. Cl. ........................ 359/426; 359/383; 359/407
[58] Field of Search .................... 359/407, 412, 359/417, 418, 480, 481, 362, 663, 383, 426

[56] References Cited

U.S. PATENT DOCUMENTS

| | | | |
|---|---|---|---|
| 4,673,260 | 6/1987 | Steinberg | 359/377 |
| 4,702,570 | 10/1987 | Yoshino et al. | 359/377 |
| 4,856,997 | 8/1989 | Mellecker | 434/72 |
| 4,929,066 | 5/1990 | Wakimoto et al. | 359/663 |
| 5,414,561 | 5/1995 | Wakimoto et al. | 359/663 |

*Primary Examiner*—Thong Nguyen
*Assistant Examiner*—Mark A. Robinson
*Attorney, Agent, or Firm*—Michael N. Meller

[57] ABSTRACT

An optical system which is telecentric to an image, having an objective optical system for forming a model image based on rays from the model magnified by a predetermined ratio to an actual object. An eyepiece lens is included for observing the model image formed through the objective optical system. The distance between the objective optical system and the eyepiece lens is varied so that a visual impression obtained by observing the model image through the eyepiece lens becomes substantially equal to a visual impression obtained by observing the actual object directly with the eyes.

16 Claims, 5 Drawing Sheets

METHOD AND APPARATUS FOR A BINOCULAR OPTICAL SYSTEM

FIELD OF THE INVENTION

This invention relates to a method and apparatus for a binocular optical system. More particularly, this invention relates to a method and apparatus for a binocular stereoscopic simulator used for verifying a visual impression of an actual object obtained by observing a model made smaller than the actual object.

BACKGROUND OF THE INVENTION

Conventionally, in order to verify a visual impression of a relatively large product before its actual manufacture, a model of the product is made and directly observed with the eyes. However, the visual impression obtained from directly observing the model, which is a different size from that of the full-sized product, is different from that obtained by directly observing the full-sized product. The reason why the visual impression of the model differs from that of the actual object or product is that the ratio of the width between the eyes of an observer to the different size of the model differs from the ratio of the width between the eyes of the observer to the size of the actual object.

For this reason, in conventional technology, it has been required to manufacture a model which is the same size as the actual object to obtain the same visual impression of the model as that of the actual object. Consequently, a great deal of time and money has to be spent manufacturing a full-sized model of a product, such as a car, for example. In fact, for some products it was not possible to have a full-sized model.

SUMMARY OF THE INVENTION

It is therefore an object of the present invention to overcome the problems noted above.

An object of the present invention is to provide a method and apparatus for a binocular optical system through which a model, magnified by a predetermined ratio to an actual object, can be observed with substantially an identical visual impression to that of the actual object.

A further object of the present invention is a method for obtaining a desired visual impression of an object by viewing a model of the object. The method includes fabricating a model having a predetermined dimensional relationship with respect to the object, and forming an objective optical system substantially telecentric to an image of the model and having a preselected first focal length. The method further includes forming a binocular eyepiece lens having a focal length substantially equal to the first focal length, and varying the distance between the objective optical system and the binocular eyepiece lens until a visual impression of the image of the model viewed through the binocular eyepiece lens becomes substantially identical to a visual impression resulting from viewing the object directly.

Still another object of the present invention is a system for obtaining a desired visual impression of an object by viewing a model of the object. The system includes a model having a predetermined dimensional relationship with respect to the object, and an objective optical system substantially telecentric to an image of the model and having a preselected first focal length. The system also includes a binocular eyepiece lens having a focal length substantially equal to the first focal length, as well as means for varying the distance between the objective optical system and the binocular eyepiece lens until a visual impression of the image of the model viewed through the binocular eyepiece lens becomes substantially identical to a visual impression resulting from viewing the object directly.

In a preferred embodiment, the present invention provides a binocular stereoscopic simulator, which includes an objective optical system substantially telecentric to the image, for forming a model image based on rays from a model magnified by a predetermined ratio to an actual object, and an eyepiece lens having a focal point approximately equal to that of the objective optical system for observing the model image formed through the objective optical system. The distance between the objective optical system and the eyepiece lens varies so that a visual impression obtained by observing the model image through the eyepiece lens becomes almost identical to that obtained by observing directly with the eyes.

In a further preferred embodiment of this invention, the condition of the following equation (1) is satisfied:

$$Wo = We \cdot (1/m) \quad (1)$$

where Wo is the distance between the right and left incident light optical axes of the objective optical system, We is the width between the eyes of an observer, and m is a predetermined magnification for the model with respect to the actual object.

Also, a preferred embodiment satisfies the condition of the following equation (2):

$$Doe = f\{2 + (f/Do) \cdot (1 - 1/m)\} \quad (2)$$

where Doe is the optical axial distance between a principal point on the image side of the objective optical system and that on the object side of the eyepiece lens; f is the focal length of the objective lens and of the eyepiece lens; Do is the optical axial distance between the model and an entrance pupil; and m is a predetermined magnification for the model with respect to the actual object.

BRIEF DESCRIPTION OF THE DRAWINGS

The above and other objects, features, and advantages of the present invention will become more apparent from the following detailed description taken with the accompanying drawings, in which:

FIG. 2, made up of FIG. 2(a), which is a schematic diagram showing lines of right and left sights when an observer observes an actual object directly with the eyes, and FIG. 2(b), which shows right and left lines of sight when an observer observes a model through the binocular stereoscopic simulator of FIG. 1;

FIG. 3 is a schematic diagram, made up of FIG. 3(a), which is a plan view, and FIG. 3(b), which is a side view of an optical configuration of the binocular stereoscopic simulator of FIG. 1;

FIG. 4 is a side view of a holding mechanism for holding each of the optical members which constitute the binocular stereoscopic simulator of FIG. 1, FIG. 4(a) showing the overall view, while FIG. 5 shows a holding mechanism for holding an eyepiece lens, one of the optical members which constitute the binocular stereoscopic simulator of FIG. 1, FIG. 5(a) showing a side view, and FIG. 5(b) showing an end view.

DESCRIPTION OF THE PREFERRED EMBODIMENTS

Figure 1:
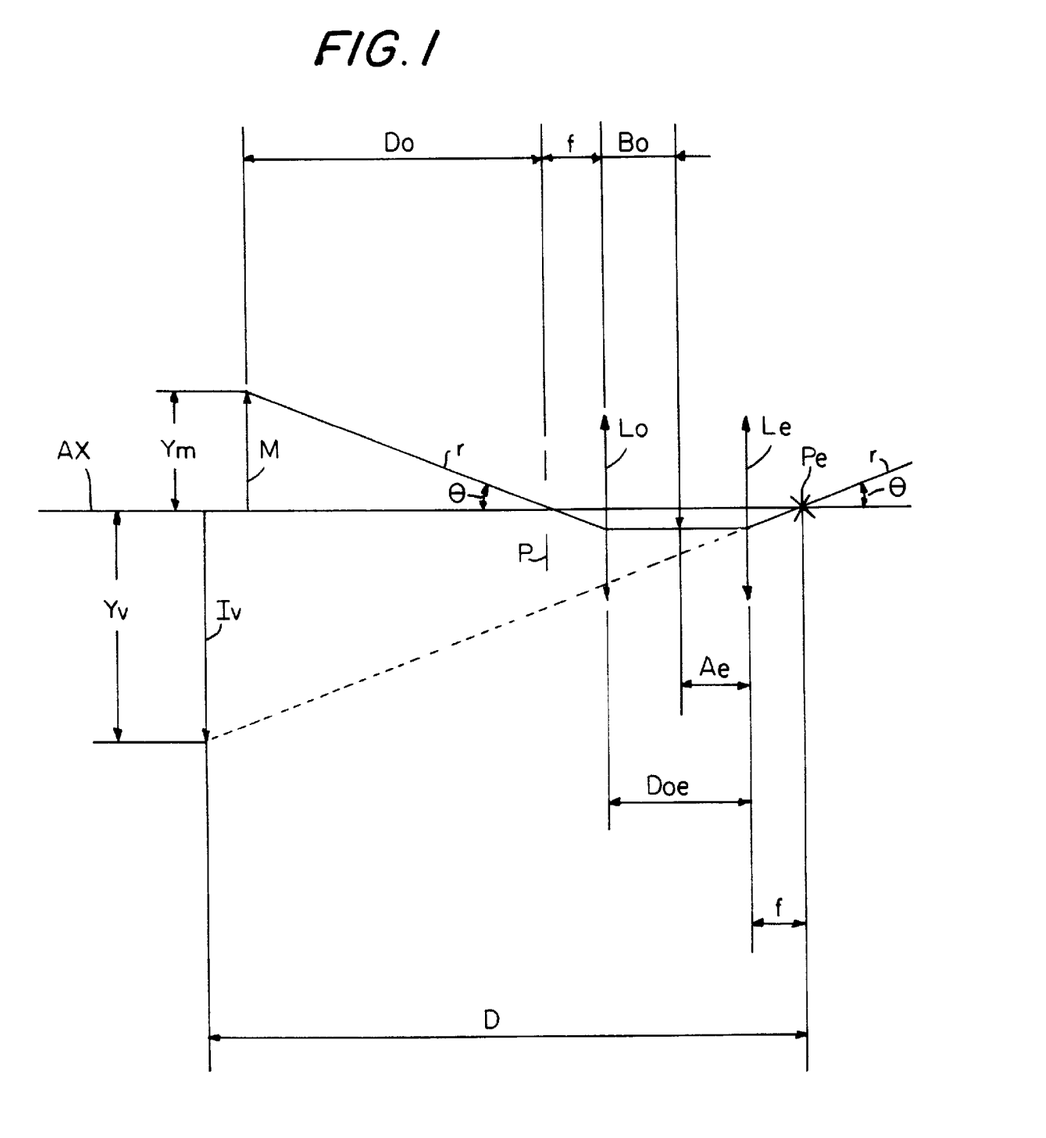
FIG. 1 is a schematic diagram of the operating principles of an embodiment of this invention showing an optical configuration of a binocular stereoscopic simulator.

Referring to the drawings, FIG. 1 is a schematic diagram of the operating principles of an embodiment of the present invention, showing an optical configuration of a binocular stereoscopic simulator. Note that the effects of rays reaching the left and right eyes of an observer are the same in the optical system incorporating the principles of the present invention. Therefore, FIG. 1 is generally described without specifically indicating the left or the right eye. FIG. 1 also omits an image erection optical system that erects a model image observed through an eyepiece lens. Further, in FIG. 1, a thin lens system is used for an optical system comprised of an objective lens and an eyepiece lens, for a simplified description.

In FIG. 1, the optical system comprises an objective lens (Lo) having a focal length (f). In addition, an aperture stop (P) is positioned at a front (object side) focal point of the objective lens (Lo). Further, an eyepiece lens (Le), having the same focal length (f) as that of the objective lens (Lo), is arranged at a point located a distance (Doe) from the objective lens (Lo) toward the image along an optical axis (AX).

In such an arrangement, a mid-image (Im) of a model (M) is formed in the optical system of FIG. 1 at a position distanced by (Bo) from the objective lens (Lo) toward the image along the optical axis (AX). Then, based on the rays from the mid-image (Im) of the model (M), a virtual image (Iv) of the model (M) is formed through the eyepiece lens (Le).

In FIG. 1, there are two conditions required to match the visual impression obtained by observing the model (M) through the optical system incorporating the principles of this invention with the visual impression obtained by observing the actual object directly with the eyes. The first condition to be satisfied is that the distance along the optical axis (AX) between the virtual image (Iv) and an exit pupil (Pe) of the observer equals the distance (D) between the actual object (O) and the entrance pupil (P'). The second condition to be satisfied is that the virtual image (Iv) equals the actual object in dimension.

As will be described hereinafter, the optical method and system incorporating the principles of this invention satisfy these two conditions. Consequently, the same visual impression as that of the actual object (O) can be obtained.

First, as illustrated in FIG. 1, the objective lens (Lo) is substantially telecentric to an image due to the effects of the aperture stop (P), and the aperture stop (P) can be considered as an entrance pupil. For this reason, a primary ray (r) from one edge of the model (M) becomes parallel to the optical axis (AX) in the optical path between the objective lens (Lo) and the eyepiece lens (Le). In other words, even if Doe, the distance between the objective lens (Lo) and the eyepiece lens (Le), varies, the distance between the eyepiece lens (Le) and the exit pupil (Pe) is constantly equal to the focal length (f) of the eyepiece lens (Le).

In addition, since the focal length of the objective lens (Lo) is equal to that of the eyepiece lens (Le), the angle (θ) between the primary ray (r) and the optical axis (AX) at the aperture stop (P) is always the same as the angle (θ) between the primary ray (r) and the optical axis (AX) at the exit pupil (Pe). As a result, the model (M) is always similar to the virtual image (Iv), thus simultaneously satisfying the above first and second conditions.

Further, it is preferable to satisfy the conditions of equation (1), noted above. Equation (1) designates the adjustment of the width between the eyes of the observer and will be described hereinafter.

Figure 2A:
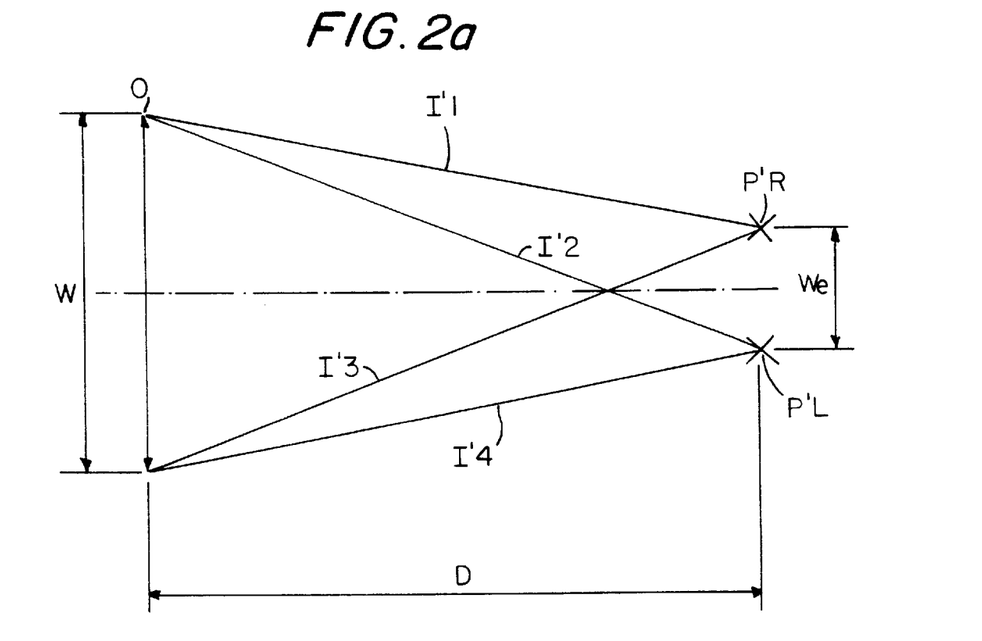
Figure 2B:
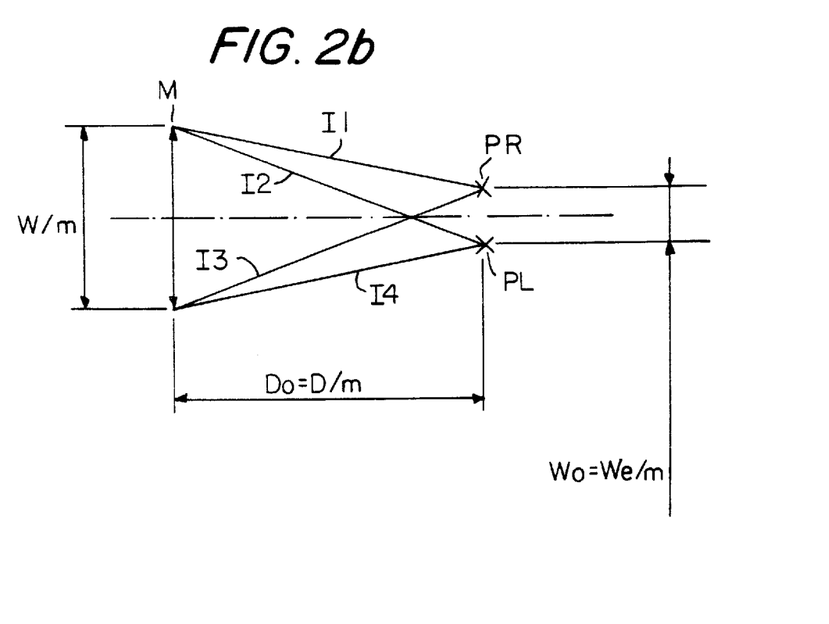

FIG. 2(a) shows right and left lines of sight of an observer who is observing an actual object (O) directly with the eyes. FIG. 2(b) shows right and left lines of sight of an observer who is observing a model (M) through the binocular stereoscopic simulator incorporating the principles of this invention.

In FIG. 2(a), the observer, whose width between the eyes is We, observes an actual object (O) of size W, which is positioned at a distance (D) along the optical axis from the observer's right and left entrance pupils (P'R) and (P'L).

In FIG. 2(a), I'1 and I'3 are the respective lines of sight when the right entrance pupil (P'R) sees the right and left edges of the actual object (O). In the same manner, I'2 and I'4 are the respective lines of sight when the left entrance pupil (P'L) sees the right and left edges of the actual object (O). Each of the lines of sight (I'1) through (I'4) defines the actual object (O).

Note that if the model (M), 1/m times the size of the actual object is observed directly with the eyes, a relative angle of each line of sight defining the model (M) would differ from that of each line of sight defining the actual object (O) no matter how the model (M) is positioned in FIG. 2(a). Consequently, the visual impression obtained by observing the model (M) may differ from that obtained by observing the actual object (O).

In accordance with the principles of this invention, as shown in FIG. 2(b), when the model (M), 1/m times the size of the actual object (O), is observed, the distance (Wo) between the right entrance pupil (PR) and the left entrance pupil (PL) (a distance between left and right incident light optical axes) in the binocular stereoscopic simulator is set to 1/m times as long as We, the width between the eyes.

This satisfies the conditions of equation (1), as noted above or Wo=We (1/m).

In addition, as shown in FIG. 2(1), Do, the distance along the optical axis between the model (M) and the entrance pupils (PR) and (PL), is set to 1/m times as long as D, the distance between the actual object (O) and the entrance pupils (P'R) and (P'L) of the observer. As a result, as shown in FIG. 2(b), the model (M) is defined by each of the lines of sight (I1) through (I4).

Comparing FIG. 2(a) to FIG. 2(b), the lines of sight (I1) through (I4) defining the model (M) are optically similar to the lines of sight (I'1) through (I'4) defining the actual object (O), resulting in the same relative angles. Consequently, the same visual impression can be obtained for the model (M) observed through the binocular stereoscopic simulator of the present invention as the visual impression of the object (O) directly observed with the eyes.

Moreover, it is preferable to satisfy equation (2), noted above. Equation (2) designates a virtual image (Iv) to be formed at a proper position. This condition is described hereinafter.

In FIG. 1, a virtual image (Iv) is formed at a position located a distance (D) measured toward the object along the optical axis (AX) from the exit pupil (Pe). The distance (D) is m times longer than Do, the distance between the model (M) and the aperture stop (P) (that is, the entrance pupil). Accordingly, the height dimension (Yv) of the virtual image (Iv) and the height dimension (Ym) of the model (M) can be expressed in the following equations (3) and (4), respectively.

$$Yv = D \cdot \tan\theta \qquad (3)$$

$$Ym = Do \cdot \tan\theta \quad (4)$$

Also, the overall height dimension (W) of the actual object (O), shown in FIG. 2(a), can be expressed in the following equation (5) because it is m times as large as the dimension (Ym) of the model (M).

$$W = m \cdot Ym = (D/Do) \cdot Ym \quad (5)$$

Further, modifying the equation (5), the relationship shown in the following equation (6) is obtained.

$$W = D \cdot \tan\theta = Yv \quad (6)$$

Thus, in the optical system incorporating the principles of this invention, if the distance measured along the optical axis (AX) between the virtual image (Iv) and the exit pupil (Pe) is set equal to D, the distance between the actual object (O) and the entrance pupil (P'), to satisfy the first condition, the dimension (Yv) of the virtual image (Iv) becomes equal to the dimension (W) of the actual object (O), consequently, satisfying the second condition.

Note that due to the relationship for imaging between the model (M) and the mid-image (Im) formed through the objective lens (Lo) in FIG. 1, the relationship shown in the following equation (7) can be established based on the paraxial optics theory:

$$Bo = f \cdot (1 + f/Do) \quad (7)$$

Further, due to the relationship for imaging between the mid-image (Im) and the virtual image (Iv) formed through the eyepiece lens (Le) in FIG. 1, the relationship shown in the following equation (8) can be established based on the paraxial optics theory:

$$Ae = f \cdot (1 - f/D) \quad (8)$$

where Ae is the distance between the intermediate image (Im) and the eyepiece lens (Le) measured along the optical axis (AX).

Therefore, according to equations (7) and (8), the relationship shown in the following equation (9) can be obtained:

$$Doe = Bo + Ae = f \cdot \{2 + (f/Do) \cdot (1 - Do/D)\} \quad (9)$$

If the relationship, Do/D=1/m is substituted in the equation (9), the relationship shown in the following equation can be obtained.

$$Doe = f\{2 + (f/Do)(1 - 1/m)\} \quad (2)$$

This is equation (2), as noted above.

In order to form a virtual image (Iv) at a position located a distance (D) measured toward the object along the optical axis (AX) from the exit pupil (Pe) in the illustrated optical system, it is preferable to satisfy the conditions of equation (2). Consequently, as mentioned before, the dimension (Yv) of the virtual image (Iv) becomes equal to the dimension (W) of the actual object (O). Therefore, the visual impression obtained by observing the model (M) through the optical system, according to the principles of this invention, becomes identical to that obtained by observing the actual object (O) directly with the eyes.

As noted above, an image erection optical system is omitted from FIG. 1. However, the inverted, mid-image (Im) can be reversed to an erect image through the effect of the image erection optical system so that the virtual image (Iv) can be observed as an erect image through the eyepiece lens (Le). In addition, a thin optical system is used in FIG. 1. However, the distance (Doe) between the objective lens (Lo) and the eyepiece lens (Le) in an actual optical system is that between the principal point on the image side of the objective lens (Lo) and the principal point on the object side of the eyepiece lens (Le).

Referring to the drawings, a preferred embodiment of the present invention will be described hereinafter.

Figure 3A:
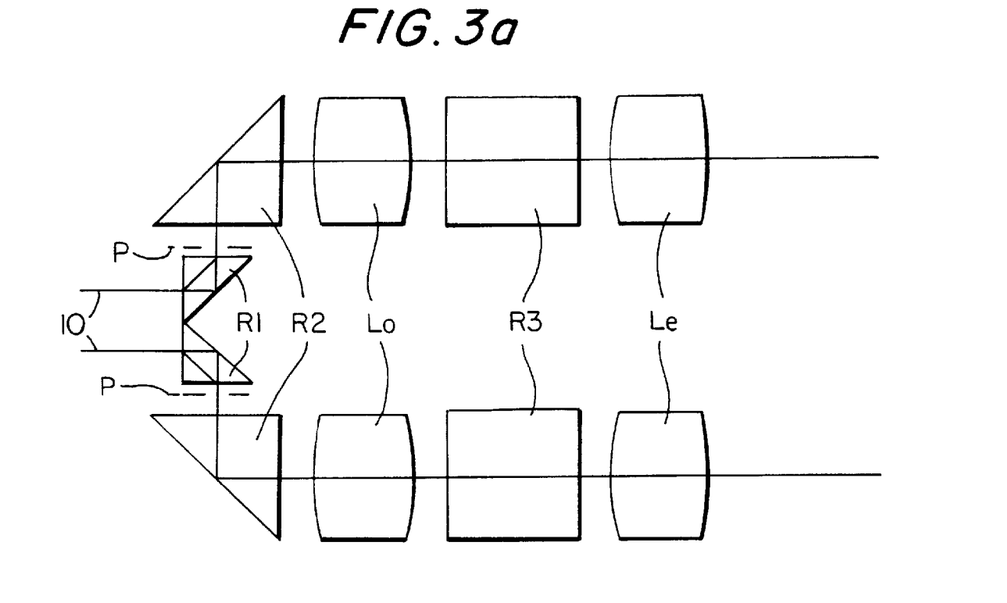
Figure 3B:
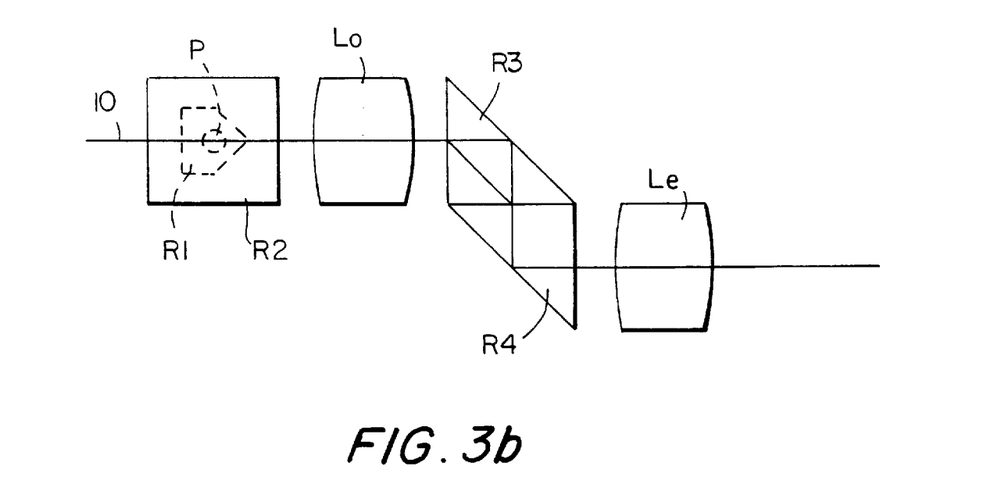

FIG. 3 is a simplified diagram showing an optical configuration of a binocular stereoscopic simulator of an embodiment of this invention. FIG. 3(a) is a plan view, while FIG. 3(b) is a side view. As shown in these figures, the binocular stereoscopic simulator of this embodiment has a right-eye optical system and a left-eye optical system of the same configuration, arranged symmetrically. Hereinafter referring to only one optical system, the configuration and operation of this embodiment is as follows:

In FIG. 3, rays 10 from a model (M) (not illustrated) magnified by a predetermined ratio to an actual object (O) are reflected twice at a first roof prism (R1), then enter an aperture stop (P). The reflected rays coming through the aperture stop (P) are again reflected at a first right-angle prism (R2), and then enter an objective lens (Lo) having a focal length (f).

Note that the aperture stop (P) is positioned at a focal point on the object side of the objective lens (Lo). Therefore, the aperture stop (P) can be regarded as an entrance pupil. Also the optical path is deflected by 90° [as shown in FIG. 3(a)] through the first roof prism (R1), and the perpendicular direction in the drawing of the image is vertically reversed.

The rays coming through the objective lens (Lo) [see FIG. 3(b)] are reflected twice at a second roof prism (R3) and once at a second right-angle prism (R4), then enter the eyepiece lens (Le) having the same focal length (f) as that of the objective lens (Lo). Through the second roof prism (R3), the optical path is deflected by 90° [as shown in FIG. 3(b)], and the perpendicular direction in the drawing of the image is reversed.

In this manner, the first roof prism (R1), the first right-angle prism (R2), the second roof prism (R3), and the second right-angle prism (R4) constitute an image erection optical system for erecting the image of the model (M) observed through the eyepiece lens (Le). In addition, through the effect of the aperture stop (P), the objective lens (Lo) is configured to be telecentric to the image.

For this reason, when the pupils of the eyes of an observer are at a position distanced by the focal length (f) from the eyepiece lens (Le), and Doe, the optical axis distance between the image principal point of the objective lens (Lo) and the object principal image of the eyepiece lens (Le), is set to satisfy the aforementioned equation (2), the erect, virtual image (Iv) of the same dimension as the actual object (O) can be observed through the eyepiece lens (Le). Consequently, an observation of the model (M) through the binocular stereoscopic simulator, constructed in accordance with the principles of this invention, provides the same visual impression as that obtained by observing the actual object (O) directly with the eyes.

Note that this embodiment has shown an example in which the image erection optical system is constituted by four prisms (R1) through (R4). However, an image erection optical system can be constituted utilizing a reflection means such as a mirror.

Figure 4A:
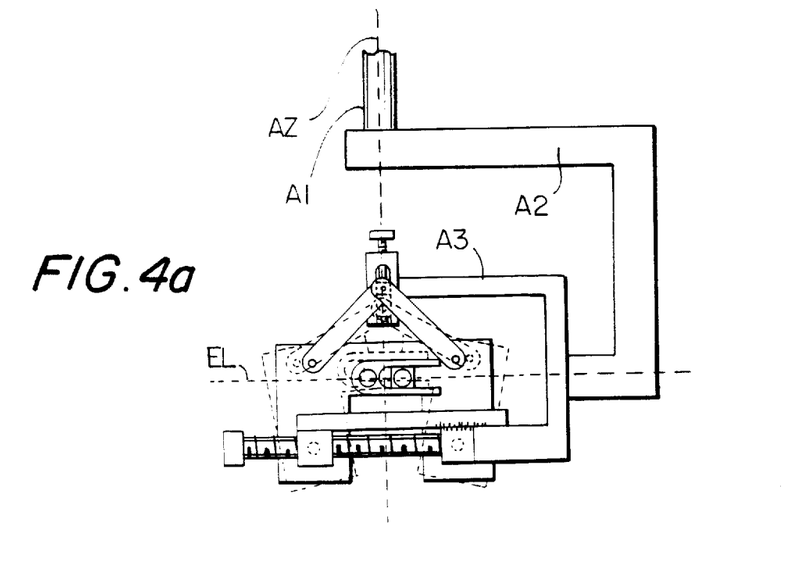
Figure 4B:
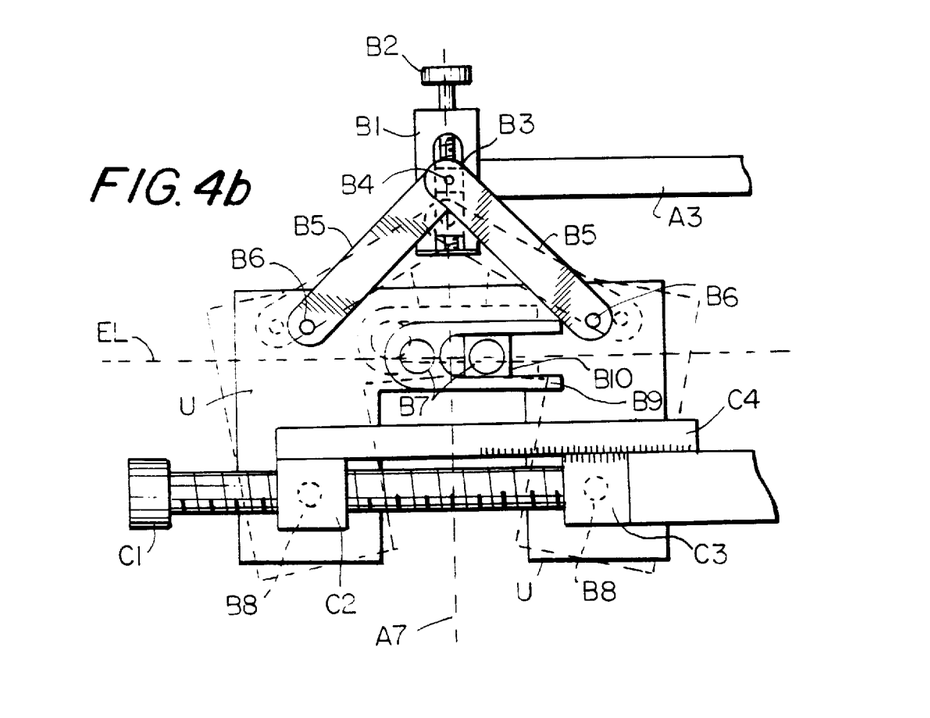
FIG. 4(b) shows an enlarged view of a portion of FIG. 4(a)

FIG. 4, made up of FIGS. 4(a) and 4(b), is a simple diagram showing a configuration of a holding mechanism for holding each optical member which constitutes the binocular stereoscopic simulator of this embodiment. FIG.

4(a) shows the overall view, while FIG. 4(b) is a magnified view of a major section.

In FIG. 4(a), the holding mechanism of this embodiment has a first holding member (A1), one end of which is connected to a member (not illustrated) which moves in three dimensions. The first holding member (A1) retains the entire holding mechanism via a second holding member (A2) and a third holding member (A3). Note that one end of the second holding member (A2) is connected to the other end of the first holding member (A1) so that it rotates around the AZ axis. The third holding member (A3) is connected to the other end of the second holding member (A2) so that it rotates around the EL axis. Since the first holding member (A1) is constructed to be movable in three dimensions without being fixed in the air in this manner, it is possible to properly change a relative positional relationship between the binocular stereoscopic simulator of this embodiment and the model to be observed.

As shown in FIG. 4(b), a slide guide (B1) is connected to one end of the third holding member (A3). Into the slide guide (B1) is arranged a movable screw (B2). Connected to the incoming end of the movable screw (B2) is a movable member (B3). Therefore, the movable member (133) moves back and forth [up and down in FIG. 4(a)] in the perpendicular direction in a groove of the slide guide (B1) as the movable screw (B2) is threaded outwardly or inwardly. A pin (B4) is mounted on the movable member (B3). One end of each of a pair of arm members (B4) is connected to the pin (B4). The other end of each of the pair of arm members (B5) is connected to an enclosure (U) via a respective pin (B6). In other words, the ends of the pair of arm members (B5) are connected to the movable member (B3) and the enclosure (U), respectively, via the pin (B4) and the pins (B6).

To the enclosure (U) is mounted a pair of cylindrical members (B7) which are configured so that a center axis of each of the cylindrical members (B7) conforms with an incident optical axis of the optical system, respectively, for a right eye and that for a left eye. A pair of pins (B8) are attached to the enclosure (U). A center axis of each of the pins (B8) is arranged to conform, respectively, with an optical axis of the eyepiece lens for a right eye and that for a left eye. Note that each of the pair of pins (B8) is, respectively, supported by a first distance-adjusting member (C2) and a second distance-adjusting member (C3) so that only rotation around the optical axis of the corresponding eyepiece lens is possible.

A reading member (B9) is provided as a scale for reading the distance between the center axes of the pair of cylindrical members (B7), that is, the distance between the incident light optical axes of the optical systems for a right eye and for a left eye. The reading member (B9) is mounted such that it can pivot around one of the cylindrical members (B7). The other one of the cylindrical members (B7) is inserted into a sliding member (B10) which passes through a guide groove of the reading member (B9). In this way, the reading member (B9) is guided by the sliding member (B10) and moves only in one dimension, in a horizontal direction in FIG. 4(b). It is possible to know Wo, the distance between the left and right incident light optical axes, by reading the scale formed on the guide groove of the reading member (B9) through an instruction mark formed on the sliding member (B10). Note that, as illustrated, it is preferable to detect a more accurate value of Wo, the distance between the left and right incident light optical axes, by forming a vernier with the reading member (B9) and the sliding member (B10).

In this way, a mechanism for varying Wo, the distance between the left and right incident light optical axes, is formed by each of the members (B1) through (B10) and the enclosure (U).

In addition, the distance between the left and right incident light optical axes can be freely set to any value by rotating the screw (B2) to change the position shown by the solid lines to the position shown by the dashed lines in FIG. 4(b). As apparent from this figure, in the holding mechanism shown in this embodiment, the plane including the left and right incident light optical axes, can be maintained parallel to the plane which includes the left and right eyepiece optical axes.

The second distance-adjusting member (C3) is connected to the other end of the third holding member (A3). The second distance-adjusting member (C3) is connected to the enclosure (U) via one of the pair of pins (138). The first distance-adjusting member (C2) is provided so that it faces the second distance-adjusting member (C3). It is also connected to the enclosure (U) via the other one of the pins (B8). Note that a scale (C4) is arranged between the first and second distance-adjusting members (C2) and (C3). Moreover, a screw (C1) for distance adjustment is held by the second distance-adjusting member (C3) through the first distance-adjusting member (C2). For this reason, the first distance-adjusting member (C2) can be shifted in one dimension in a horizontal direction in the figure by rotating the screw (C1) for distance adjustment. As mentioned before, the center axes of the first and second distance-adjusting members (C2) and (C3) are, respectively, identical to the eyepiece optical axes. Therefore, the amount which the distance between the first and second distance-adjusting members (C2) and (C3) varies equals the amount which the width between the eyes of the eyepiece lens varies.

Therefore, by reading the scale formed on the scale (C4), the distance between the center axes of the first and second distance-adjusting members (C2) and (C3), further, the axes between the eyes of the eyepiece lens can be measured. In this embodiment, as illustrated, a vernier is formed between the scale (C4) and the second distance-adjusting member (C3), and a more accurate value of the width between the eyes of the eyepiece lens can be read.

In this way, a mechanism for adjusting the width between the eyes of the eyepiece lens is constituted by each of the members (C1) through (C4), the pins (B8), and the enclosure (U).

Figure 5A:
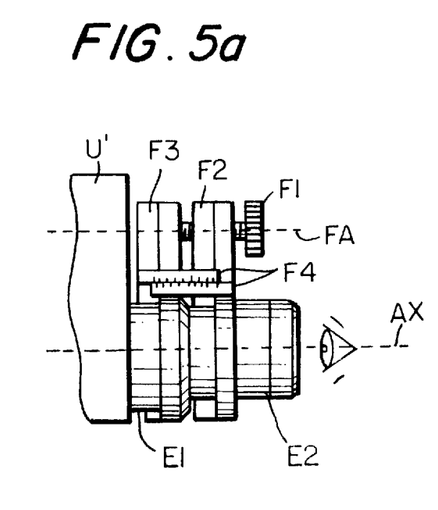
Figure 5B:
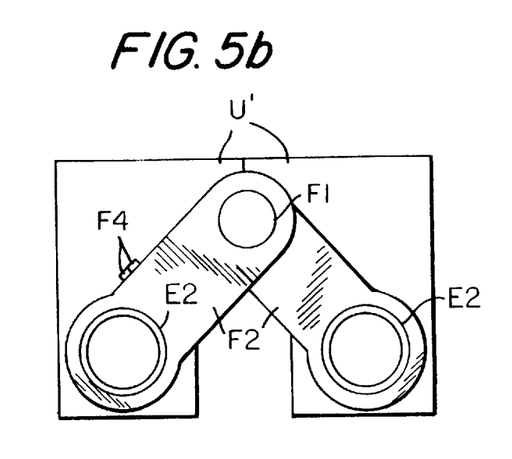

FIG. 5, made up of FIGS. 5(a) and 5(b), shows a simple configuration of a holding mechanism for holding the eyepiece lens, one of the optical systems which constitute the binocular stereoscopic simulator of this embodiment: FIG. 5(a) shows the side view, and FIG. 5(b) shows the end view.

In FIG. 5, a pair of eyepiece cylinders (E2) are, respectively, inserted into a pair of inserting members (E1). The pair of inserting members (E1) are, respectively, mounted on the enclosure (U'), and connected to one end of each of a pair of supporting members (F3) so that only rotation around the optical axis (AX) is possible. Also, the pair of eyepiece cylinders (E2) are, respectively, connected to one end of each of a pair of shifting members (F2) such that they rotate only around the optical axis (AX). Note that a screw (F1) along the axis (FA) is arranged between the other end of the pair of shifting members (F2) and the other end of the pair of supporting members (F3). The screw (F1) is supported by the other end of the pair of supporting members (F3), passing through the other end of the pair of shifting members (F2). In this way, the pair of shifting members (F2) and the pair of supporting members (F3) are connected to each other in such a way that they rotate only around the common axis (FA).

As described, the mechanism for adjusting the distance between the objective lens and the eyepiece lens is formed by the members E1, E2, and F1 through F3.

For this reason, when the screw (F1) is rotated, the pair of shifting members (F2) moves back and forth along the axis (FA), which is horizontal in FIG. 5(a). At that time, following the movement of the pair of shifting members (F2), the pair of eyepiece cylinders (E2) move back and forth by the same distance in a horizontal direction in the figure. Note that the distance that the pair of eyepiece cylinders (E2) shift can be measured by a vernier scale (F4). The vernier scale (F4) has an upper scale portion mounted on one of the pair of supporting members (F3) and a lower scale portion mounted on one of the pair of shifting members (F2). In this way, based on the amount that the pair of eyepiece cylinders (E2) move, (Doe) the distance between the principal points of the objective lens (Lo) and the eyepiece lens (Le) can be obtained. Further, it is preferable that the amount that the distance (Doe) varies is accurately read using the vernier scale (F4).

As described above, according to this invention, by determining the pupils of an observer's both eyes at a position distanced by a focal length from an eyepiece lens, and by setting the distance between the objective lens and the eyepiece lens to a predetermined length, an erect, virtual image of the same dimension as the actual object can be observed through the eyepiece lens. In other words, by observing a model through a binocular stereoscopic simulator constructed in accordance with the principles of this invention, the same visual impression as that obtained from a direct observation of an actual object with the eyes can be obtained. Consequently, without manufacturing a full-sized model, which is normally large and expensive and requires much time, a visual impression of the product can be provided prior to the actual manufacture of the full-sized product.

Also, other than the above-mentioned industrial applications, the present invention can be applied to the area of education and entertainment. For example, in a museum exhibiting a model of a piece of architecture, a visitor can observe the model through the binocular stereoscopic simulator embodying this invention. The visitor will appear to see the full-sized object from observing the model. As a result, the visitor obtains much insight into the exhibition, being inspired by a deeper understanding of the exhibit. It is also possible to provide the observer with the illusion of being larger or smaller than the actual size on the exhibit. Therefore, this invention can be applied to machines used for entertainment purposes, at a game shop and the like.

Various modifications will become possible for those skilled in the art after receiving the teachings of the present disclosure without departing from the scope thereof.

What is claimed is:

1. A system for obtaining a desired visual impression of an object by viewing a model of said object, said system comprising:
    a model having a predetermined dimensional relationship with respect to said object;
    an objective optical system substantially telecentric to an image of said model and having a preselected first focal length;
    a binocular eyepiece lens having a focal length substantially equal to said first focal length; and
    means for varying the distance between said objective optical system and said binocular eyepiece lens until a visual impression of the image of said model viewed through said binocular eyepiece lens becomes substantially identical to a visual impression resulting from viewing said object directly, wherein said objective optical system has left and right incident light optical axes and which satisfies the following condition:

$$Wo = We \cdot (1/m)$$

where Wo is the distance between the left and right incident light optical axes;
    We is the width between the eyes of an observer; and
    m is a predetermined magnification for said model with respect to said actual object.

2. Apparatus, as claimed in claim 1, wherein said objective optical system has an image side with a principal point thereon, said lens has an object side with a principal point thereon, and which satisfies the following condition:

$$Doe = f\{2 + (f/Do) \cdot (1 - 1/m)\}$$

where Doe is the optical axial distance between said principal point on the image side of said objective optical system and said principal point on the object side of said eyepiece lens;
    f is the focal length of said objective optical system and of said eyepiece lens;
    Do is the optical axial distance between said model and an entrance pupil of the eye of an observer; and
    m is a predetermined magnification for said model with respect to said actual object.

3. Apparatus, as claimed in claim 2, having an image erection optical system that erects said image of said model observed through said eyepiece lens.

4. Apparatus, as claimed in claim 1, wherein said objective optical system has an image side with a principal point thereon, said lens has an object side with a principal point thereon, and which satisfies the following condition:

$$Doe = f\{2 + (f/Do) \cdot (1 - 1/m)\}$$

where Doe is the optical axial distance between said principal point on the image side of said objective optical system and said principal point on the object side of said eyepiece lens;
    f is the focal length of said objective optical system and of said eyepiece lens;
    Do is the optical axial distance between said model and an entrance pupil of the eye of an observer; and
    m is a predetermined magnification for said model with respect to said actual object.

5. Apparatus, as claimed in claim 4, having an image erection optical system that erects said image of said model observed through said eyepiece lens.

6. Apparatus, as claimed in claim 1, having an image erection optical system that erects said image of said model observed through said eyepiece lens.

7. A binocular stereoscopic simulator comprising:
    an objective optical system having a preselected first focal length and being substantially telecentric to an image to form a model image based on rays from a model of an actual object, said model having a predetermined size with respect to said actual object;
    an eyepiece lens having a focal length substantially equal to said first focal length of said objective optical system, for observing said model image formed through said objective optical systems; and means for varying the distance between said objective optical system and said eyepiece lens so that a visual impression obtained by observing said model image through said eyepiece lens becomes substantially identical to a visual impression obtained by observing said actual object directly with the eyes, wherein said objective optical system has left and right incident light optical axes and which satisfies the following condition:

$$Wo=We\cdot(1/m)$$

where Wo is the distance between the left and right incident light optical axes;

We is the width between the eyes of an observer; and m is the predetermined magnification for said model with respect to said actual object.

8. Apparatus, as claimed in claim 7, wherein said objective optical system has an image side with a principal point thereon, said lens has an object side with a principal point thereon, and which satisfies the following condition:

$$Doe=f\{2+(f/Do)\cdot(1-1/m)\}$$

where Doe is the optical axial distance between said principal point on the image side of said objective optical system and said principal point on the object side of said eyepiece lens;

f is the focal length of said objective optical system and of said eyepiece lens;

Do is the optical axial distance between said model and an entrance pupil of the eye of an observer; and m is a predetermined magnification for said model with respect to said actual object.

9. Apparatus, as claimed in claim 8, having an image erection optical system that erects said image of said model observed through said eyepiece lens.

10. Apparatus, as claimed in claim 7, wherein said objective optical system has an image side with a principal point thereon, said lens has an object side with a principal point thereon, and which satisfies the following condition:

$$Doe=f\{2+(f/Do)\cdot(1-1/m)\}$$

where Doe is the optical axial distance between said principal point on the image side of said objective optical system and said principal point on the object side of said eyepiece lens;

f is the focal length of said objective optical system and of said eyepiece lens;

Do is the optical axial distance between said model and an entrance pupil of the eye of an observer; and m is a predetermined magnification for said model with respect to said actual object.

11. Apparatus, as claimed in claim 10, having an image erection optical system that erects said image of said model observed through said eyepiece lens.

12. Apparatus, as claimed in claim 7, having an image erection optical system that erects said image of said model observed through said eyepiece lens.

13. A method for obtaining a desired visual impression of an object by viewing a model of said object, said method comprising the steps of:

fabricating a model having a predetermined dimensional relationship with respect to said object;

forming an objective optical system substantially telecentric to an image of said model and having a preselected first focal length;

forming a binocular eyepiece lens having a focal length substantially equal to said first focal length; and varying the distance between said objective optical system and said binocular eyepiece lens until a visual impression of the image of said model viewed through said binocular eyepiece lens becomes substantially identical to a visual impression resulting from viewing said object directly, wherein said objective optical system has left and right incident light optical axes and which satisfies the following condition:

$$Wo=We\cdot(1/m)$$

where Wo is the distance between the left and right incident light optical axes;

We is the width between the eyes of an observer; and m is a predetermined magnification for said model with respect to said actual object.

14. A method, as claimed in claim 13, including the step of forming an image erection optical system that erects said image of said model observed through said eyepiece lens.

15. A method, as claimed in claim 13, wherein said objective optical system has an image side with a principal point thereon, said lens has an object side with a principal point thereon, and which satisfies the following condition:

$$Doe=f\{2+(f/Do)\cdot(1-1/m)\}$$

where Doe is the optical axial distance between said principal point on the image side of said objective optical system and said principal point on the object side of said eyepiece lens;

f is the focal length of said objective optical system and of said eyepiece lens;

Do is the optical axial distance between said model and an entrance pupil of the eye of an observer; and m is a predetermined magnification for said model with respect to said actual object.

16. A method, as claimed in claim 15, including the step of forming an image erection optical system that erects said image of said model observed through said eyepiece lens.

* * * * *